United States Patent
Druhan

(10) Patent No.: US 8,196,386 B2
(45) Date of Patent: Jun. 12, 2012

(54) POSITION SENSORS, METERING VALVE ASSEMBLIES, AND FUEL DELIVERY AND CONTROL SYSTEMS

(75) Inventor: David Druhan, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 1120 days.

(21) Appl. No.: 12/051,443

(22) Filed: Mar. 19, 2008

(65) Prior Publication Data

US 2009/0235665 A1    Sep. 24, 2009

(51) Int. Cl.
*F02C 9/00* (2006.01)

(52) U.S. Cl. .............. 60/39.281; 60/803; 324/207.25

(58) Field of Classification Search .......... 60/39.281, 60/734, 803; 137/554; 324/207.25
See application file for complete search history.

(56) References Cited

U.S. PATENT DOCUMENTS

| | | | |
|---|---|---|---|
| 3,580,706 A | 5/1971 | Frieling, Jr. | |
| 3,676,226 A | 7/1972 | Badia et al. | |
| 3,686,859 A * | 8/1972 | White | 60/790 |
| RE33,082 E | 10/1989 | Gerstmann et al. | |
| 5,371,052 A | 12/1994 | Kawamura et al. | |
| 5,882,184 A | 3/1999 | Feldermann | |
| 5,944,507 A | 8/1999 | Feldermann | |
| 6,380,326 B2 | 4/2002 | Fitzwater et al. | |
| 6,449,973 B2 | 9/2002 | Dodge et al. | |
| 6,948,455 B2 | 9/2005 | Ferguson et al. | |
| 7,220,154 B2 | 5/2007 | Lawson | |
| 7,511,477 B2 * | 3/2009 | Niwa | 324/207.16 |
| 2004/0150395 A1 * | 8/2004 | Miya et al. | 324/207.25 |
| 2006/0176051 A1 * | 8/2006 | Miya | 324/207.25 |

FOREIGN PATENT DOCUMENTS

| | | |
|---|---|---|
| JP | 4363004 | 12/1992 |
| JP | 11069682 | 3/1999 |

* cited by examiner

*Primary Examiner* — Louis Casaregola
(74) *Attorney, Agent, or Firm* — Ingrassia Fisher & Lorenz, P.C.

(57) ABSTRACT

Position sensors, metering valve assemblies, and fuel delivery and control systems are provided. In an embodiment, by way of example only, a position sensor includes a rotor, a primary winding wound around the rotor, a stator surrounding at least a portion of the rotor and the primary winding, and a secondary winding disposed adjacent to the stator. At least one of the primary winding and the secondary winding comprises copper and nickel.

16 Claims, 2 Drawing Sheets

POSITION SENSORS, METERING VALVE ASSEMBLIES, AND FUEL DELIVERY AND CONTROL SYSTEMS

TECHNICAL FIELD

The inventive subject matter generally relates to fuel delivery systems, and more particularly relates to assemblies and components, such as position sensors, for use in the systems.

BACKGROUND

Gas turbine engines typically have fuel supply systems for delivering fuel to a combustor, where the fuel is ignited to produce a thrust. In many engines, the fuel is stored in a fuel source, such as a fuel tank, and is drawn out by one or more pumps. The pumps pressurize the fuel and deliver the pressurized fuel to manifolds in the combustor via a main supply line. To control the rate at which the fuel flows through the system, the main supply line may include one or more valves in flow series between the pumps and the fuel manifolds. These valves generally include at least a main metering valve and a bypass valve downstream thereof. The bypass valve may be disposed in a bypass flow line connected upstream of the metering valve for allowing a portion of the fuel flowing in the main supply line back to the inlet of the one or more pumps.

During operation, it may be desirable to determine a flow rate across the main metering valve to establish whether the bypass valve should be used or whether to change the flow rate of the fuel through the system. In this regard, a position sensor may be coupled to the main metering valve. The position sensor can include various components such as a rotor, a stator, and primary and secondary windings. The rotor is typically coupled to the main metering valve, and the primary winding, which is disposed on the rotor, is used as a reference winding to which the secondary winding on the stator is compared. Thus, when the flow rate across the main metering valve changes, the rotor changes rotational position to thereby produce a positional difference between the reference winding and the secondary winding. The positional difference is then communicated to a controller, which determines whether to send a signal to increase or decrease the flow rate across the main metering valve.

Although the aforementioned systems are adequate for use in conventional engines, they may be improved. For example, in some engines, the position sensor components are disposed in a housing having a chamber that is in fluid communication with the system. In some cases, the housing chamber may be filled with or exposed to fuel from the system. As engine power output demands increase, engine operating temperatures tend to increase as well, causing the position sensor components to be subjected to high-temperature fuels (e.g., fuels having a temperature greater than about 180° C.). The high-temperature fuels may decrease the useful life of the position sensor components, in particular, the primary and secondary copper windings. As a result, the position sensors may be replaced more frequently than when exposed to lower temperature fuels, and the maintenance costs of the engine may undesirably increase.

Accordingly, it is desirable to have a fuel delivery system that can be employed in high temperature environments. In addition, it is desirable for the system to include assemblies that include components, such as position sensors, may be exposed to high-temperature fuels (e.g., greater than 180° C.). Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Position sensors, metering valve assemblies, and fuel delivery and control systems are provided.

In an embodiment, by way of example only, a position sensor includes a rotor, a primary winding wound around the rotor, a stator surrounding at least a portion of the rotor and the primary winding, and a secondary winding disposed adjacent to the stator. At least one of the primary winding and the secondary winding comprises copper and nickel.

In another embodiment, by way of example only, a metering valve assembly includes a metering valve adapted to move from a first position to a second position and a position sensor coupled to the metering valve. The position sensor includes a rotor adapted to rotate in response to a movement of the metering valve from the first position to the second position, a primary winding wound around the rotor, a stator surrounding at least a portion of the rotor and the primary winding, and a secondary winding disposed adjacent to the stator. At least one of the primary winding and the secondary winding comprises copper and nickel.

In still another embodiment, by way of example only, a fuel delivery and control system for use between a fuel source and a combustor includes a supply line adapted to provide fluid communication between the fuel source and the combustor, a metering valve disposed in axial flow series with the supply line and adapted to move from a first position to a second position, and a position sensor coupled to the metering valve. The position sensor includes a rotor adapted to rotate in response to a movement of the metering valve from the first position to the second position, a primary winding wound around the rotor, a stator surrounding at least a portion of the rotor and the primary winding, and a secondary winding disposed adjacent to the stator. At least one of the primary winding and the secondary winding comprises copper and nickel.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
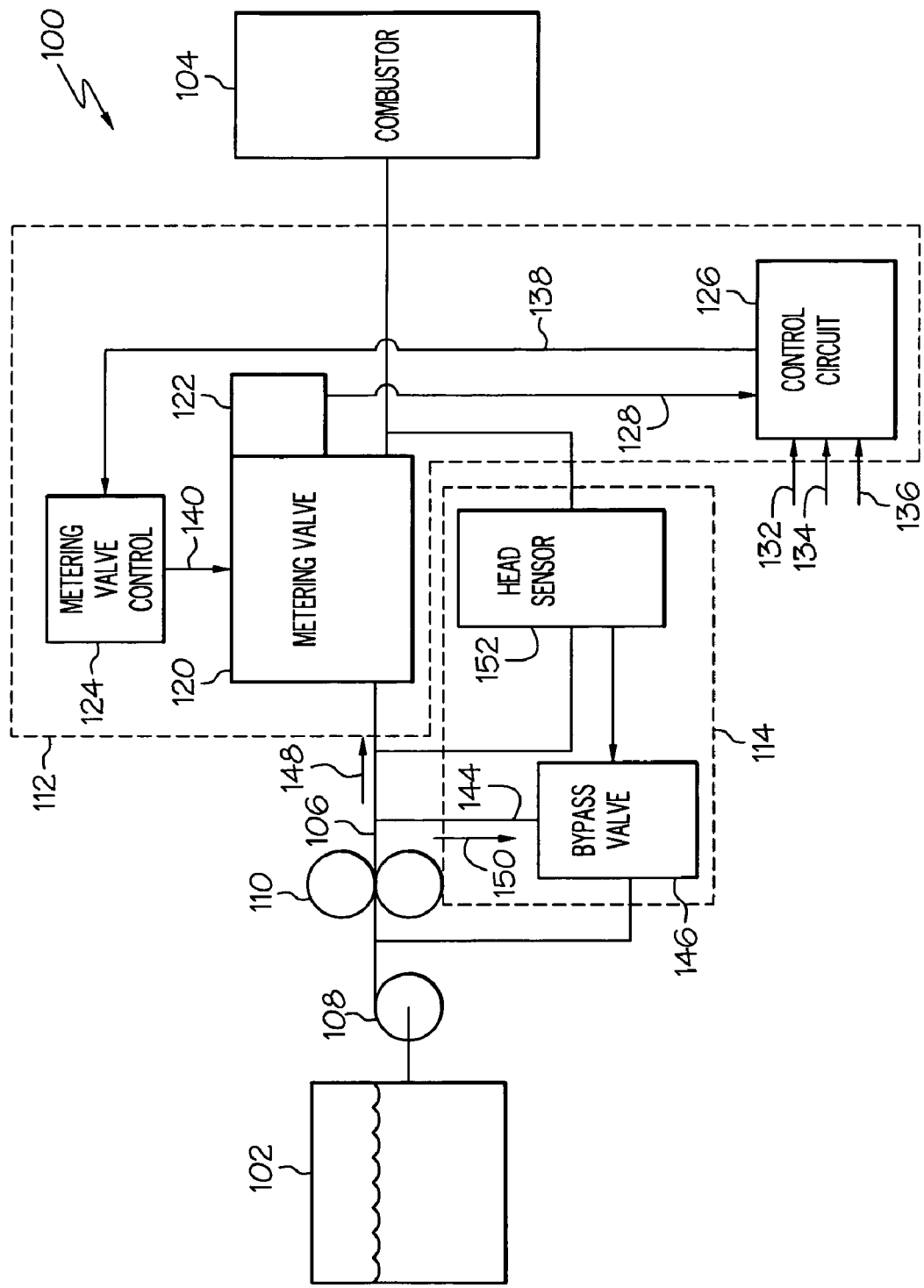
FIG. 1 is a block diagram of fuel delivery and control system for a gas turbine engine, according to an embodiment.

FIG. 1 is a block diagram of a fuel delivery and control system 100 for a gas turbine engine, according to an embodiment. The system 100 is adapted to deliver fuel from a fuel source 102 to a combustor 104, where the fuel may be ignited and combusted to produce thrust for the engine. The fuel source 102 and combustor 104 are in fluid communication with each other via a supply line 106. In an embodiment, the supply line 106 includes one or more pumps 108, 110, a metering valve assembly 112, and a bypass flow assembly 114, which operate together to regulate the flow of the fuel through the system 100.

The fuel source 102 may be a tank or other fuel storage container, which may be used to house fuel suitable for use in a gas turbine engine. In one embodiment, the fuel may be a kerosene-based fuel, such as jet fuel. As alluded to above, the supply line 106 delivers the fuel to other components of the system 100. In this regard, the supply line 106 may made up of one or more flexible or inflexible tubular structures, such as pipes or other connectors that are suitable for flowing fuel. Although indicated by a single reference number, it will be appreciated that the reference number is intended to include the connections between each component of the system 100 that provides fluid communication between and provides fuel from the fuel source 102 to the combustor 104.

The fuel may be driven through the supply line 106 by one or more pumps 108, 110. In an embodiment, two pumps 108, 110 may be disposed in axial flow series with the supply line 106 between the fuel source 102 and the combustor 104. In an example, the first pump 108 may be in direct flow communication with the fuel source 102 and may be employed to initiate flow through the system 100. In this regard, the first pump 108 may be a vacuum-type pump, such as a low horsepower (e.g., below about 20 hp) centrifugal pump. In other embodiments, a pump capable of acting as a booster pump may be used. The second pump 110 may be employed to supply the fuel to downstream components in the system 100. In such case, the second pump 110 may be made up of a pump capable of pressurizing the fuel to a relatively high pressure (e.g., greater than 1000 psig). In an embodiment, the second pump 110 may be selected for an ability to pressurize the fuel to up to about 2500 psi. Suitable pumps include, but are not limited to, positive displacement pumps, and variable displacement pumps. Although two pumps 108, 110 are shown in FIG. 1, a single pump capable of both drawing the fuel out of the fuel source 102 and pressurizing the fuel to a desired pressure may alternatively be used. In other embodiments, more than two pumps alternatively may be employed.

To control the rate at which the fuel flows through the system 100, the metering valve assembly 112 is in axial flow series with the supply line 106 and positioned downstream of the high pressure pump 110. In an embodiment, the metering valve assembly 112 may include a metering valve 120, a position sensor 122, a metering valve control device 124, and a control circuit 126. The metering valve 120 may be any type of valve that has an adjustable flow area through which the fuel may flow. For example, the metering valve 120 may be a variable flow area orifice-type valve, a butterfly valve, a sliding spool valve, or a sliding or spinning spool valve with an exponential orifice, or any other suitable type of valve capable of moving from an initial, first position to a different, second position, where either of the positions can be a substantially open, a partially open, and a substantially closed position. As used herein, the term "substantially open" may be defined as having a flow area substantially equal to (e.g., within ±5%) of a total maximum flow area. The term "substantially closed" may be defined as having a flow area that is substantially sealed so that less than about 5% of a total maximum flow area remains unsealed. The term "partially open" may be defined as having a flow area in a range of between about 5% and about 95% the total maximum flow area.

The position sensor 122 is coupled to the metering valve 120 and is adapted to sense a position of the valve 120. In particular, the position sensor 122 senses the particular position change of the metering valve 120 when the metering valve 120 moves from the first position to the second position. In this regard, the position sensor 122 may be made up of a resolver that is capable of translating the sensed position change into a valve position signal 128 and to transmit the signal 128 to the control circuit 126. In some embodiments of the fuel delivery and control system 100, the position sensor 122 may be exposed to fuel during operation, and the fuel may have a temperature in a range of about −4° C. to about 180° C. Thus, to improve the useful life of the position sensor 122, corrosion-resistant components may be included therein, according to various embodiments. The position sensor 122 and its corrosion-resistant components will be described in more detail below.

With continued reference to FIG. 1, the control circuit 126 is adapted to produce a drive signal 138, based on the valve position signal 128 and various other input signals from other components. In an embodiment, the control circuit 126 may be adapted to receive an input control signal 132 from throttle control equipment (not illustrated) in a cockpit, a compressor discharge pressure signal 134 representative of the discharge pressure from the compressor in the non-illustrated engine, and/or an ambient pressure signal 136 representative of ambient pressure around the system 100. The received signals 128, 132, 134, 136 may be used to determine whether to move the metering valve 120 from the second position to a different, third position to thereby adjust the flow rate of the fuel. For example, if a decrease in the fuel flow rate is desired, the valve 120 may be moved from the second position towards a substantially closed third position. If a flow rate increase is desired, the valve 120 may be moved towards a substantially open third position. In an embodiment, the control circuit 126 may be implemented within an engine controller located remotely from the fuel delivery and control system 100, such as a Full Authority Digital Engine Controller (FADEC), or may be a local controller isolated from other systems.

The metering valve control device 124 supplies a metering valve control signal output 140 to the metering valve 120, in response to the drive signal 138 from the control circuit 126. As a result, the metering valve 120, if commanded, may move to the third position to thereby adjust its flow area to allow the fuel to flow to the combustor 104 at the desired increased or decreased flow rate. In an embodiment, the metering valve assembly 112 may be hydraulically-operated and may be controlled by an electro-hydraulic servo valve (EHSV). In such case, the metering valve assembly 112 may be coupled to other systems or controllers (such as the control circuit 126). In another embodiment, the metering valve assembly 112 may be electrically-operated and may be implemented as an independent controller.

The bypass flow assembly 114 is adapted to flow a portion of the fuel from a first location in the system 100 to a second, upstream location in the system 100. To do so, the bypass flow assembly 114 includes a bypass flow line 144 and a bypass valve 146 coupled thereto. The bypass flow line 144 may be made up of one or more sets of piping or other tubular structures for carrying fuel and may extend between two or more desired components of the system 100. For example, as shown in FIG. 1, the bypass flow line 144 may be adapted to direct the fuel from a location in the supply line 106 that is downstream of the second pump 110 to a location that is upstream of the second pump 110. In other embodiments, a portion of the fuel may be directed from a location of the supply line 106 that is downstream of the metering valve assembly 112 back to the inlet of the first pump 108, back to the inlet of the second pump 110, or in some cases, back to the fuel source 102.

The bypass valve 146 is positioned in flow-series in the bypass flow line 144, and may be adapted to adjust a flow area through which the fuel may flow. For example, the bypass valve 146 may be variable flow area orifice-type valve, a butterfly valve, a sliding spool valve, or a sliding or spinning spool valve with an exponential orifice, or any other suitable type of valve capable of moving between substantially open, partially open, and a substantially closed positions. In an embodiment, the bypass valve 146 operates in conjunction with the metering valve 120 so that in the event an excess amount of fuel is present at the metering valve 120, the excess fuel may be returned to an upstream location in the system 100. For example, as shown in FIG. 1, a first fraction 148 of the fuel in the supply line 106 may be directed to the metering valve 120, and a second fraction 150, representing the excess fuel, may be directed to the bypass valve 146.

In an embodiment, the position, and thus the flow area, of the bypass valve 146, is controlled via a head sensor 152. The head sensor 152 communicates with and may be coupled to the bypass valve 146 and is in communication with the metering valve 120 to thereby sense the differential pressure ($\Delta P$) between the inlet and outlet thereof. Based on the differential pressure, the head sensor 152 may supply a command to the bypass valve 146 to adjust its flow area. The head sensor 152 may be any one of numerous types of sensors known in the art, such as a thermally-compensated, spring-loaded, diaphragm-type sensor, or a bellows-type head sensor. In other embodiments, other types of sensors may be used; however, the selection of the particular sensor type may be dependent, for example, on the fuel delivery and control system 100 arrangement and type of valve used for the bypass valve 146.

Figure 2:
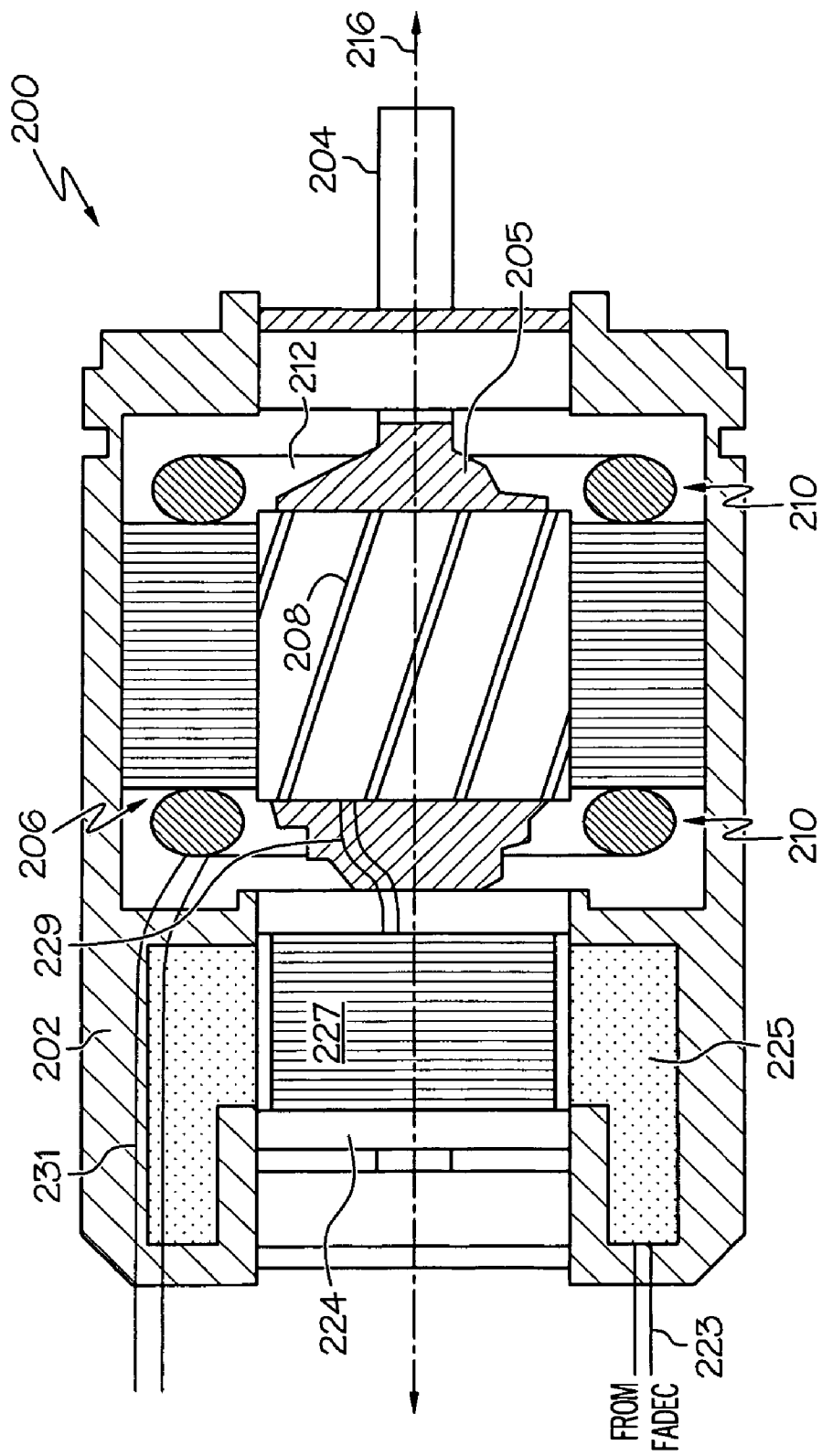
FIG. 2 is a cross-sectional view of a position sensor that may be implemented into the system depicted in FIG. 1, according to an embodiment.

As mentioned briefly above, the useful life of the system 100 may be improved by including corrosion-resistant components, such a corrosion-resistant position sensor 122 according to various embodiments. For example, as discussed above, the corrosion-resistant position sensor 122 may be a resolver that is corrosion-resistant when exposed to fuel, including high-temperature fuel (e.g., greater than 180° C.). Turning to FIG. 2, a cross section view of a position sensor 200 is provided, according to an embodiment. The position sensor 200 includes a housing 202, a shaft 204, a stator 206, at least two sets of windings 208, 210, and a rotary transformer 224, in an embodiment. The housing 202 may be generally cylindrical or tubular and defines a chamber 212 within which the position sensor 200 components are disposed. In an embodiment, the position sensor 200 may be relatively small; thus, the housing 202 may have an axial length of between about 2.5 cm and 4.0 cm, an outer diameter that is between about 1.5 cm and about 2.0 cm, and an inner diameter of between about 1.2 cm and about 1.5 cm. In other embodiments, the position sensor 200 may be smaller or larger.

The shaft 204 extends through the chamber 212 and has an end that may be supported by rolling elements (not shown) in some embodiments and that is configured to be coupled to the metering valve 120 (shown in FIG. 1). Thus, when the metering valve 120 changes position, the shaft 204 rotates in response. A rotor 205 may be mounted to or integrally formed on the shaft 204 and may be configured to include the first set of windings 208 thereon. In an embodiment, the rotor 205 is adapted to rotate in response to a movement of the metering valve 120 (FIG. 1) from a first position to a second position. The first set of windings 208, which may be referred to as a "primary" or "reference" winding, may be wound around a circumference of the rotor 205 and extend along an axial length of the rotor 205. In another embodiment, the first set of windings 208 may be disposed parallel to a longitudinal axis 216 extending through the rotor 205. In another embodiment, the first set of windings 208 may be disposed at an angle in a range of about 1 degree to about 360 degrees relative to the longitudinal axis 216. In any case, the first set of windings 208 may be made up of one or more wires, such as magnet wire, that are wound around the rotor 205. The wire may comprise copper and nickel, in an embodiment. In another embodiment, the wire may comprise a copper nickel alloy that may include copper in a range of about 94% to about 98% by weight and nickel in a range of about 2% to about 6% by weight. In another embodiment, the wire may have a core comprising about 100% copper by weight and a layer around the core comprising about 100% nickel by weight. The layer may be plated onto the core and may be relatively thin, for example, having a thickness in a range of about 0.005 mm to about 0.012 mm. In any case, the wires in the aforementioned embodiments may additionally include one or more layers of polyimide varnish as insulation.

The stator 206 may be coupled to or may extend radially inwardly from an inner surface of the housing 202. In an embodiment, the stator 206 surrounds at least a portion of the rotor 205 and the first set of windings 208 and remains stationary relative thereto. The stator 206 may be constructed of a conductive material, such as a ferrite material, or other material suitable for use in a motor. To allow the rotor 205 to rotate, the stator 206 may have an inner surface that is spaced apart from the rotor 205 and first set of windings 208 to form a gap.

The second set of windings 210, which may also be referred to as "secondary" windings, is disposed about 90 degrees relative to the first set of windings 208 and may be disposed on the stator 206. Similar to the first set of windings 208, the second set of windings 210 is made up of wire, such as magnet wire. The wire may comprise copper and nickel, in an embodiment. In another embodiment, the wire may comprise a copper nickel alloy that may include copper in a range of about 94% to about 98% by weight and nickel in a range of about 2% to about 6% by weight. In another embodiment, the wire may have a core comprising about 100% copper by weight and a layer around the core comprising about 100% nickel by weight. The layer may be plated onto the core and may be relatively thin, for example, having a thickness in a range of about 0.005 mm to about 0.012 mm. In any case, the wires in the aforementioned embodiments may additionally include one or more layers of polyimide varnish as insulation. It will be appreciated that the second set of windings 210 may be made of the same copper nickel alloy as the first set of windings 208, in an embodiment. In another embodiment, the two sets of windings 208, 210 may be made of different copper nickel alloys. In an alternate embodiment of the position sensor 200, a brushless design may be employed where the first and second set of windings 208, 210 are wound circumferentially about the rotor 205 and the stator 206, respectively.

As briefly mentioned above, the rotary transformer 224 may be included in the position sensor 200. In an embodiment, the rotary transformer 224 may be configured to inductively couple to the windings of the resolver 208, 210. For example, in brushless designs, the rotary transformer 224 includes a stator winding 225 and a rotor winding 227. The stator winding 225 is mounted to the housing 202 and is adapted to receive a sinusoidal voltage from the FADEC (not shown) via an electrical connection 223. The rotor winding 227 is mounted to the shaft 204, which may be supported by rolling elements (not shown). In an embodiment, the rotor winding 227 is disposed such that voltage from the stator winding 225 may be inductively transferred to the rotor winding 227. In another embodiment, the rotor winding 227 is electrically coupled via an electrical connection 229 to the first set of windings 208. Thus, during operation, when the rotor 205 rotates as acted upon by the metering valve 120 (FIG. 1), an impedance of the magnetic circuit changes resulting in a change in an output voltage 231 change in the secondary winding 210. The change in output voltage 231 is in turn communicated to the control circuit 126 (FIG. 1). In any case, the rotary transformer 224 may be disposed adjacent to the rotor 205 and the stator 206 that fluidly communicates with the supply line 106 (shown in FIG. 1) and thus, the first and second sets of windings 208, 210 thereon may be exposed to fuel.

Because the first and second sets of windings 208, 210 (or "primary" and "secondary" windings) are made of copper nickel alloy, the position sensor 200 may have an improved useful life over conventional position sensors. In one example, a copper magnet wire and a copper nickel alloy magnet wire were immersed in jet fuel having a temperature of 180° C. for about 336 hours. The copper magnet wire had a purity of greater than 99% copper by weight, and the copper nickel magnet wire comprised of 98% copper by weight and 2% nickel by weight were tested. Each magnet wire was a 37 gauge, six-inch length of wire including an insulative coating thereon. Defects (cuts) were made in the insulative coating of each wire to expose the copper and the copper nickel alloy. After the immersion, it was found that the insulative coating on the copper magnet wire wore away and the copper magnet wire experienced corrosion around about 75% of its circumference. In contrast, the insulative coating of the copper nickel magnet wire remained attached to the wire and the wire experienced roughening only at the defects. Additionally, the copper magnet wire experienced a loss of about 15% of its total original material, while the copper nickel magnet wire experienced less than 3% loss of its total original material.

Hence, by employing copper nickel alloy magnet wires in the position sensor (e.g. resolver), the fuel delivery and control system 100 may have fewer maintenance issues, as the position sensor may be replaced less frequently. Moreover, the improved position sensor may be used on system 100 that are exposed to high temperature fuel (e.g., greater than 180° C.). It will be appreciated that although the copper nickel alloy magnet wires are described above as being used in position sensors (and resolvers), the copper nickel alloy magnet wires may also or alternatively be implemented as part of other components that may be exposed to high temperature jet fuel. For example, the copper nickel alloy magnet wires may be used in electro-hydraulic servo valves (EHSV), linear or rotary variable differential transformers (LVDT, RVDT), synchros or Hall-Effect sensors.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A position sensor, comprising:
   a rotor;
   a primary winding wound around the rotor;
   a stator surrounding at least a portion of the rotor and the primary winding;
   a secondary winding disposed adjacent to the stator, wherein at least one of the primary winding and the secondary winding comprises copper and nickel, and wherein a rotary transformer disposed adjacent to the rotor, wherein a portion of the primary winding and a portion of the secondary winding are wound around the rotary transformer.

2. The position sensor of claim 1, wherein the primary winding and the secondary winding each comprise a magnet wire comprising a copper nickel alloy.

3. The position sensor of claim 1, wherein the at least one of the primary winding and the secondary winding comprises a core including about 100% by weight of copper and a layer around the core including about 100% by weight of nickel.

4. The position sensor of claim 1, wherein the stator comprises a ferrite material.

5. The position sensor of claim 1, further comprising:
   a housing having an inner surface defining a chamber;
   wherein the stator extends radially inwardly from the inner surface of the housing and the rotor extends through the chamber.

6. A position sensor, comprising:
   a rotor;
   a primary winding wound around the rotor;
   a stator surrounding at least a portion of the rotor and the primary winding; and
   a secondary winding disposed adjacent to the stator, wherein at least one of the primary winding and the secondary winding comprises copper and nickel, and wherein the at least one of the primary winding and the secondary winding comprises copper in a range of about 94% and about 98% by weight and nickel in a range of about 2% and about 6% by weight.

7. A meter valve assembly, comprising:
   a metering valve adapted to move from a first position to a second position;
   a position sensor coupled to the metering valve, the position sensor including:
      a rotor adapted to rotate in response to a movement of the metering valve from the first position to the second position;
      a primary winding wound around the rotor;
      a stator surrounding at least a portion of the rotor and the primary winding; and
      a secondary winding disposed adjacent to the stator, wherein at least one of the primary winding and the secondary winding comprises copper and nickel; and
   a rotary transformer disposed adjacent to the rotor, wherein a portion of the primary winding and a portion of the secondary winding are wound around the rotary transformer.

8. The assembly of claim 7, wherein the primary winding and the secondary winding each comprise a magnet wire comprising a copper nickel alloy.

9. The assembly of claim 7, wherein at least one of the primary winding and the secondary winding comprises copper in a range of about 94% and about 98% by weight and nickel in a range of about 2% and about 6% by weight.

10. The assembly of claim 7, wherein at least one of the primary winding and the secondary winding comprises a core including about 100% by weight of copper and a layer around the core including about 100% by weight of nickel.

11. The assembly of claim 7, wherein the stator comprises a ferrite material.

12. The assembly of claim 7, further comprising:
a housing having an inner surface defining a chamber;
wherein the stator extends radially inwardly from the inner surface of the housing and the rotor extends through the chamber.

13. A fuel delivery and control system for use between a fuel source and a combustor, the system comprising:
a supply line adapted to provide fluid communication between the fuel source and the combustor;
a metering valve disposed in axial flow series with the supply line and adapted to move from a first position to a second position; and
a position sensor coupled to the metering valve, the position sensor including:
a rotor adapted to rotate in response to a movement of the metering valve from the first position to the second position;
a primary winding wound around the rotor;
a stator surrounding at least a portion of the rotor and the primary winding; and
a secondary winding disposed adjacent to the stator, wherein at least one of the primary winding and the secondary winding comprises copper and nickel, and wherein at least one of the primary winding and the secondary winding comprises copper in a range of about 94% to about 98% by weight and nickel in a range of about 2% to about 6% by weight.

14. The system of claim 13, further comprising:
a pump in axial flow series with the fuel supply line upstream of the metering valve.

15. The system of claim 14, further comprising:
a bypass line extending from a first location downstream of the pump to a second location upstream of the pump.

16. The system of claim 13, wherein the primary winding and the secondary winding each comprise a magnet wire comprising the copper nickel alloy.

* * * * *